(12) United States Patent
Harben, III

(10) Patent No.: US 10,952,446 B1
(45) Date of Patent: Mar. 23, 2021

(54) PAW TRACKER DEVICE, SYSTEM AND METHOD

(71) Applicant: Grover S. Harben, III, Gainesville, GA (US)

(72) Inventor: Grover S. Harben, III, Gainesville, GA (US)

(*) Notice: Subject to any disclaimer, the term of this patent is extended or adjusted under 35 U.S.C. 154(b) by 0 days.

(21) Appl. No.: 16/720,540

(22) Filed: Dec. 19, 2019

(51) Int. Cl.
*A22C 21/00* (2006.01)

(52) U.S. Cl.
CPC ...... *A22C 21/0053* (2013.01); *A22C 21/0007* (2013.01); *A22C 21/0046* (2013.01)

(58) Field of Classification Search
CPC . A22C 21/00; A22C 21/0023; A22C 21/0053; A22C 21/0069; A22C 21/00769; A22C 21/0021; A22C 21/0084
USPC ................. 452/177, 180, 182–184
See application file for complete search history.

(56) References Cited

U.S. PATENT DOCUMENTS

| | | | | |
|---|---|---|---|---|
| 6,450,872 B1* | 9/2002 | Haley | ............... | A22C 21/0023 452/166 |
| 8,202,143 B1* | 6/2012 | Taylor | .................. | A22B 5/0058 452/166 |
| 8,562,397 B1* | 10/2013 | Palmateer | .......... | A22C 21/0053 452/183 |
| 9,675,093 B1* | 6/2017 | Harben | .................. | A22C 21/00 |
| 2003/0190880 A1* | 10/2003 | Haley | .................. | A22B 5/0058 452/167 |
| 2014/0349559 A1* | 11/2014 | Harben, III | ........ | A22C 21/0007 452/166 |

* cited by examiner

*Primary Examiner* — Richard T Price, Jr.
(74) *Attorney, Agent, or Firm* — The Sladkus Law Group

(57) ABSTRACT

A paw tracker for maintaining poultry paws in an ordered, indexed manner so that each paw can be matched with the carcass from which it was removed is provided. The paw tracker has a plurality of columns defining a plurality of pockets vertically aligned on the column. A rotatable gate corresponds to each pocket of the plurality of pockets. At least one gate arm urges each gate of the plurality of gates from a closed position to an open position at a predetermined time and a rotating assembly is configured to move the plurality of columns at a predetermined speed.

20 Claims, 6 Drawing Sheets

US 10,952,446 B1

PAW TRACKER DEVICE, SYSTEM AND METHOD

FIELD OF THE INVENTION

The present invention relates generally to a paw tracker device for correlating a poultry paw with the carcass from which it was removed. More specifically, the invention pertains to devices, systems and methods for maintaining poultry paws in an ordered, indexed manner so that each paw can be matched with the carcass from which it was removed.

BACKGROUND OF THE INVENTION

A "paw" refers to the foot of poultry, such as chicken, turkey, quail, duck and the like, once the foot is removed from the bird. In conventional poultry processing plants, the bird is hung on an overhead conveyor and killed. As the bird continues to move along the overhead conveyor (referred to as a picking line), the foot or paw can be cut or otherwise separated from the rest of the carcass. The separated bird is transferred to the eviscerating line, while further down the picking line, the foot or paw is removed from the picking line by a paw cutter or foot unloader. As the bird moves down the eviscerating line its passes before a USDA or plant inspector. If the bird is condemned by the inspector, then the paw or foot must be thrown away. Because the time to reach the inspector is greater than the time for the foot or paw to reach the foot unloader or paw cutter, a paw holding and correlation system must be used. That is, the foot or paw needs to be tracked or indexed so that the paw is traceable to the bird from which it was cut.

Conventional paw holding and correlation systems include a belt conveyor having a length of around one hundred feet or more and a picking line having a length extended by around six hundred feet or more. A shackle count and shift registers in a computer can be used to identify the foot or paw. These belt systems require a large time gate to remove the condemned paws. This throws away many good paws, undesirably lowering the yield of the plant.

Further, long picking lines can be expensive and difficult to install and maintain. Belt systems can require a large amount of room to install the six hundred feet or more of picking line. These belt systems can have great difficulty in maintaining the correlation between the paw and bird because the line can stretch, the inspector can stop the evisceration line and the like. When the correlation is lost, the uncorrelated paws must be disposed of or held until uncorrelated paws can be correlated.

Accordingly, it remains desirable in the pertinent art to provide a paw tracker that maintains paws in an ordered, indexed so that the paw can be traced to a carcass.

SUMMARY

Disclosed herein is a paw tracker for maintaining poultry paws in an ordered, indexed manner so that each paw can be matched with the carcass from which it was removed. In one aspect, the paw tracker comprises a plurality of substantially vertical columns, each column at least partially defining a plurality of pockets substantially vertically aligned on the column; a plurality of gates, each gate corresponding to a pocket of the plurality of pockets, wherein each gate is rotatable about and between a closed position, in which a portion of the gate contacts a rear wall of the column and encloses a bottom of the pocket, and an open position, in which the portion of the gate is spaced from the rear wall a predetermined distance; at least one gate arm configured to urge each gate of the plurality of gates from the closed position to the open position at a predetermined time; and a rotating assembly configured to move the plurality of columns at a predetermined speed, wherein the poultry paw is positionable in a pocket of the plurality of pockets, wherein movement of the column created by the rotating assembly causes the gate of the pocket to contact the at least one gate arm and urge the gate to the open position, and wherein in the open position, the poultry paw drops out of the pocket.

Also disclosed herein is a method of maintaining poultry paws in an ordered manner comprising providing a paw tracker system comprising: a plurality of substantially vertical columns, each column at least partially defining a plurality of pockets substantially vertically aligned on the column; a plurality of gates, each gate corresponding to a pocket of the plurality of pockets, wherein each gate is rotatable about and between a closed position, in which a portion of the gate contacts a rear wall of the column and encloses a bottom of the pocket, and an open position, in which the portion of the gate is spaced from the rear wall a predetermined distance; at least one gate arm configured to urge each gate of the plurality of gates from the closed position to the open position at a predetermined time; and a rotating assembly configured to move the plurality of columns at a predetermined speed; and positioning a poultry paw in a first pocket of the plurality of pockets, wherein movement of the plurality of columns causes the gate of the first pocket to engage the gate arm and rotate from the closed position to the open position such that the poultry paw drops from the first pocket.

Also disclosed herein is a paw tracker system for correlating a poultry paw with the carcass from which it was removed, the paw tracker comprising a plurality of columns, each column at least partially defining a plurality of pockets vertically aligned on the column; a plurality of rotatable gates, each gate corresponding to a pocket of the plurality of pockets; at least one gate arm configured to urge each gate of the plurality of gates from a closed position to an open position at a predetermined time; and a rotating assembly configured to move the plurality of columns at a predetermined speed, wherein the poultry paw is positionable in a pocket of the plurality of pockets, wherein movement created by the rotating assembly causes the gate of the pocket to contact the at least one gate arm and urge the gate to the open position, and wherein in the open position, the poultry paw drops out of the pocket.

Related methods of operation are also provided. Other apparatuses, methods, systems, features, and advantages of the paw tracker will be or become apparent to one with skill in the art upon examination of the following figures and detailed description. It is intended that all such additional apparatuses, methods, systems, features, and advantages be included within this description, be within the scope of the paw tracker, and be protected by the accompanying claims.

DESCRIPTION OF THE INVENTION

Figure 1:
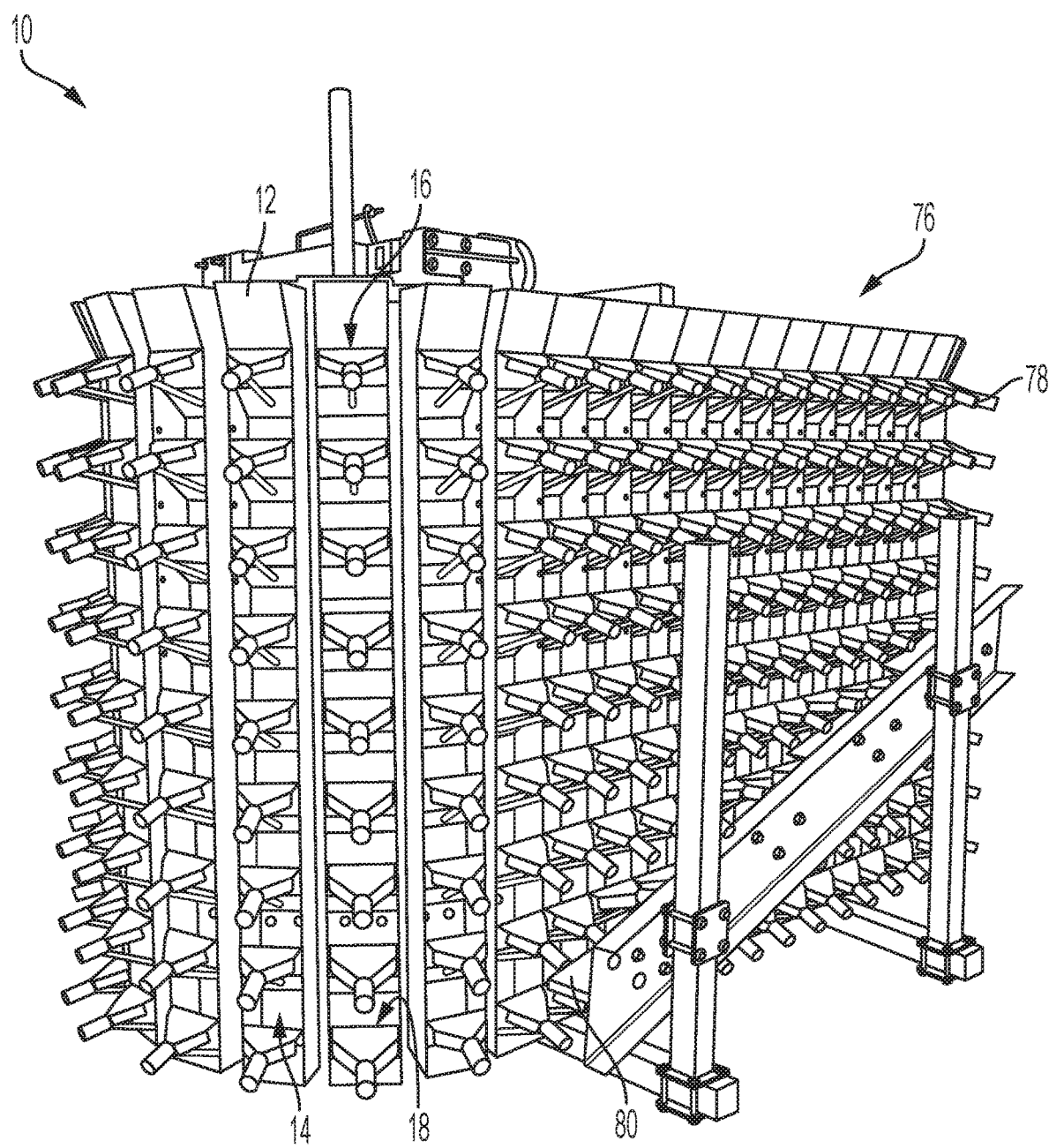
FIG. 1 is a perspective view of the paw tracker of the present application, showing a plurality of pockets arranged in columns and rows, according to one aspect.

The present invention can be understood more readily by reference to the following detailed description, examples, and claims, and their previous and following description. Before the present system, devices, and/or methods are disclosed and described, it is to be understood that this invention is not limited to the specific systems, devices, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known aspect. Those skilled in the relevant art will recognize that many changes can be made to the aspects described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to an "element" includes aspects having two or more elements unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The application relates to paw tracker devices, systems and methods for correlating a poultry paw with the carcass from which it was removed. In one aspect, and as illustrated in FIGS. 1-6, the paw tracker 10 can comprise a plurality of substantially vertical columns 12 such that each column partially defines a plurality of pockets 14. The pockets 14 can be sized and shaped to hold a paw therein, and the pockets can be substantially vertically aligned on the column 12 so that a paw can be dropped from an upper pocket 16 to a lower pocket 18 at a predetermined time.

Figure 2:
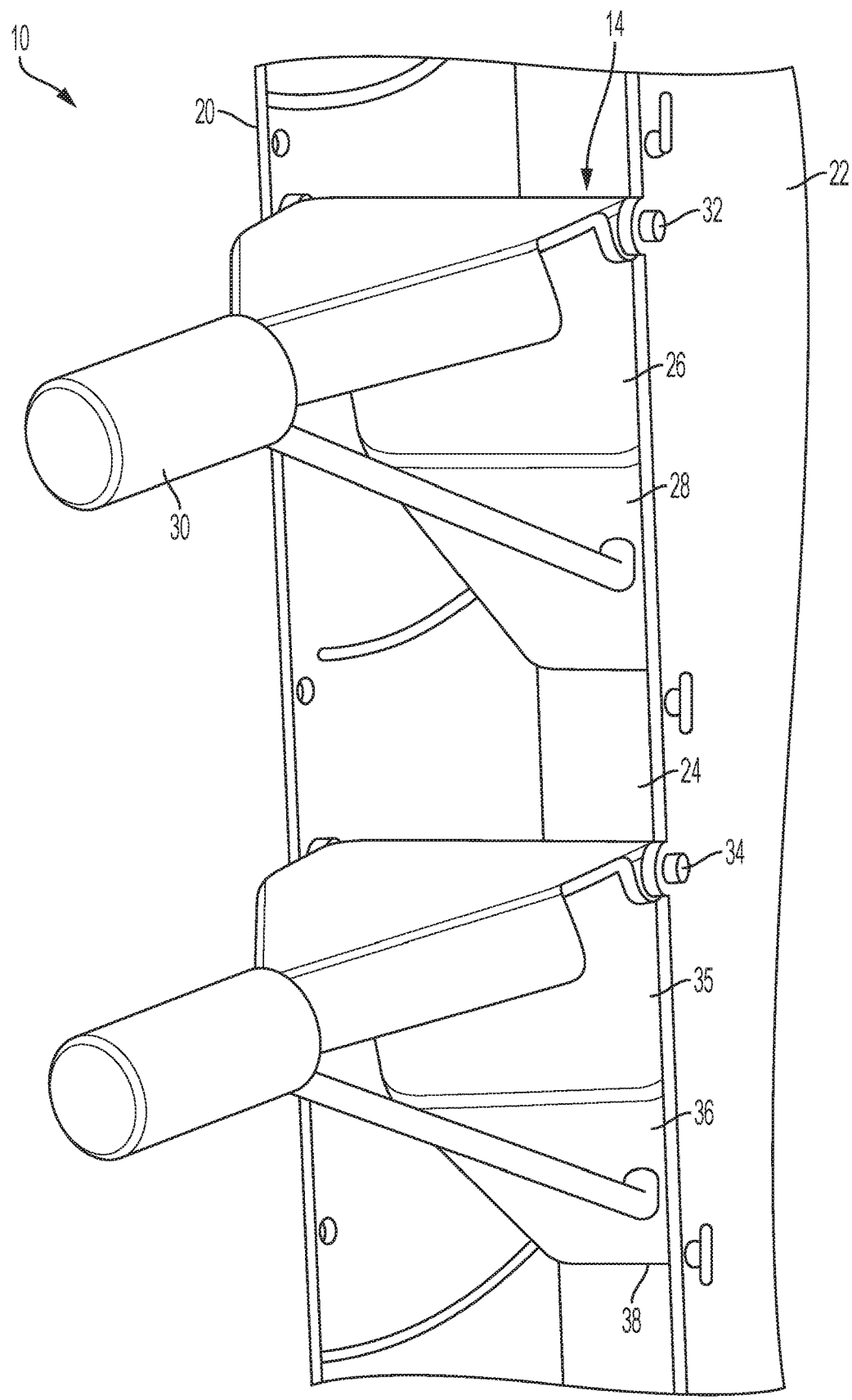
FIG. 2 is a magnified perspective view of two pockets of the plurality of pockets of the paw tracker of FIG. 1.

FIG. 2 illustrates the pockets 14 more closely. In one aspect, the column 12 comprises a left sidewall 20, an opposed right sidewall 22, and a rear wall 24 extending between the left sidewall 20 and the right sidewall 2. A rotatable gate 26 can extend between the left sidewall 20 and the right sidewall 22 such that the gate is opposed to the rear wall 24. In another aspect, the gate 26 can comprise a base member 28 coupled to a counterweight 30. The left sidewall 20, the right sidewall 22, the rear wall 24 and the base member 28 of the gate 26 can cooperate to define the pocket 14. Optionally, and as illustrated in the figures, the left sidewall 20, the right sidewall 22, and the rear wall 24 can extend along a least a portion of the length of the column 12 so that each of the left sidewall 20, the right sidewall 22, and the rear wall 24 can partially define a plurality of pockets 14 that are substantially vertically aligned. It is contemplated, however, that a plurality of left sidewalls 20 and plurality of right sidewalls 22 can be positioned on the column 12 so that each left sidewall 20 and right sidewall 22 partially define a single pocket 14.

In one aspect, the gate 26 can extend between and can be rotatably coupled to the left sidewall 20 and the right sidewall 22 at a pivot point 32 with a hinge, a rotation pin 34 and the like. The base member 28 of the gate 26 can be sized and shaped to extend from the pivot point 32 to the rear wall 24 so that the base member 28 can form a front side 35 and a bottom 36 of the pocket 14. That is, the base member 28 can be sized and shaped so that a distal end 38 of the base member 28 can be in contact with a portion of the rear wall 24 when the base member 28 is in a closed position, described more fully below. In one aspect, the base member 28 can be solid sheet of material as illustrated in the figures. In another aspect, the base member 28 can be formed with perforations, slots and the like to let liquids pass through the base member 28. In still another aspect, the base member 28 can be formed from tines and the like that can hold a solid material while letting liquids pass through.

The counterweight 30 of the gate 26 can extend away from the base member 28 a predetermined distance and can weigh a predetermined amount. In one aspect, the counterweight 30 can be sized and shaped so that at rest and without the presence of any other forces, the mass of the counterweight 30 urges the distal end 38 of the base member 28 into contact with the rear wall 24 of the column 12 to enclose the lower portion of the pocket 14. In another aspect, the counterweight 30 can be sized and shaped so that, in a closed position and with a plurality of paws positioned in the pocket 14, the mass of the counterweight 30 urges the distal end 38 of the base member 28 into contact with the rear wall 24. Alternatively, springs, pistons and the like can be used to urge the distal end 38 of the base member 28 into contact with the rear wall 24 of the column 12 to enclose the pocket 14.

In use then, the gate 26 can be rotatable about and between a closed position, in which the distal end 38 of the base member 28 is in contact with the rear wall 24 of the column 12 to enclose the lower portion of the pocket 14, and an open position, in which the distal end 38 of the base member 28 is spaced from the rear wall 24 of the column 12 a predetermined distance so that any contents of the pocket 14 can drop out of the pocket 14.

It is contemplated that any number of pockets 14 can be substantially aligned along a column 12. In one example, the column 12 can define two pockets comprising just the upper pocket 16 and the lower pocket 18. Alternatively, and as illustrated in FIG. 1, nine pockets 14 can be substantially aligned along a column 12. Optionally, in other aspects, and number if pockets 14 can be substantially aligned along a column 12. In use, a paw placed in the upper pocket 16 can travel down the column 12 through each intermediate pocket before reaching a lower pocket 18.

Figure 3:
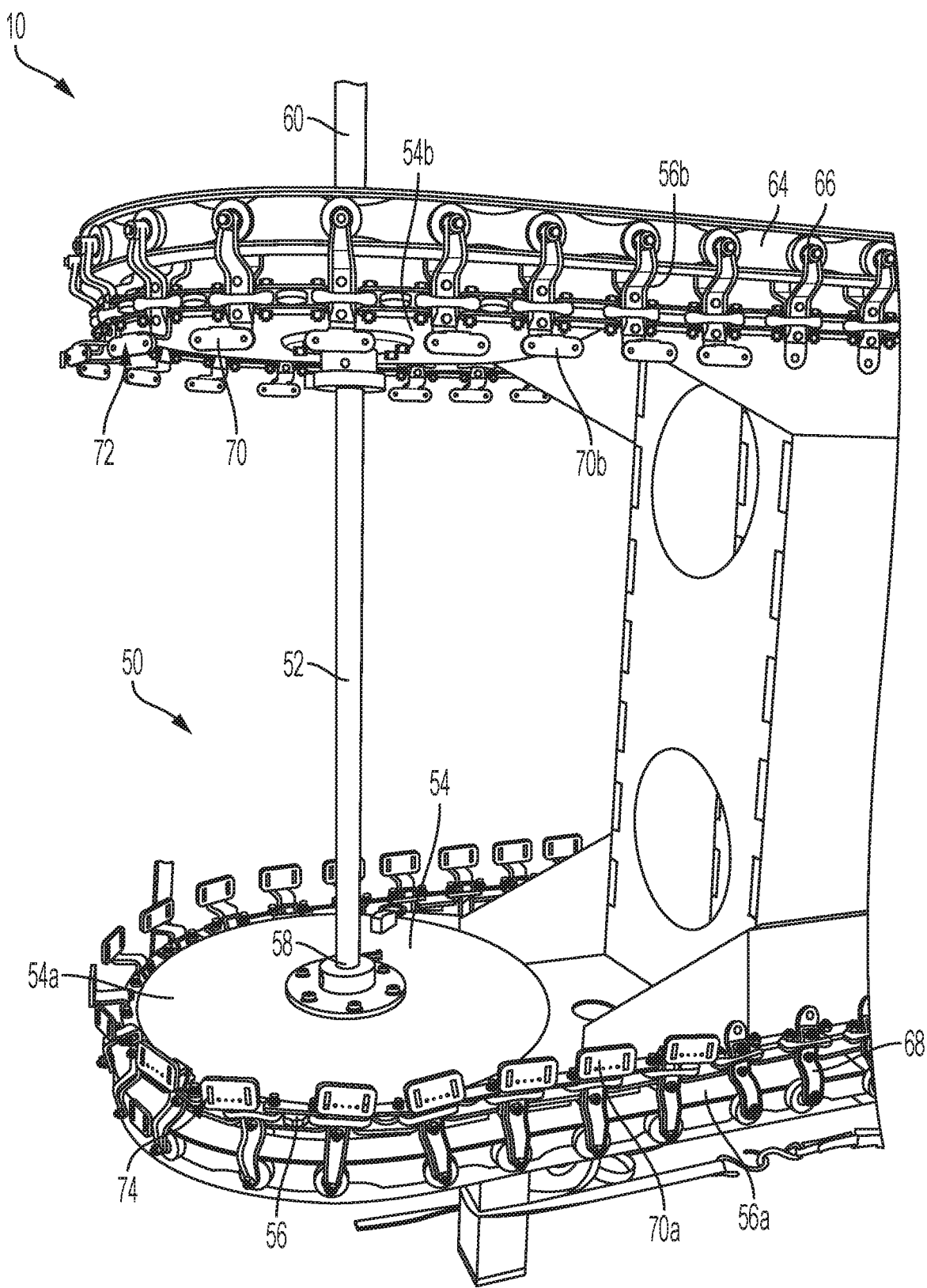
FIG. 3 is a perspective view of a rotating assembly of the paw tracker of FIG. 1.

In one aspect and as illustrated in FIG. 3, the paw tracker 10 further comprises a rotating assembly 50 configured to move the plurality of columns 12 to a predetermined position. For example, the rotating assembly can comprise at least one rotatable shaft 52, at least one sprocket 54 and at least one chain 56. In one aspect, the shaft 52 can be positioned substantially vertically and the sprocket 54 can be coupled to the shaft 52 so that rotation of the shaft 52 causes the sprocket 54 to rotate at a rotation speed. The chain 56 can be coupled to the sprocket 54 so that rotation of the sprocket 54 causes the chain 56 to move. Optionally, a first sprocket 54a can be positioned near or adjacent a lower end 58 of the shaft 52, and a second sprocket 54b can be positioned near or adjacent an upper end 60 of the shaft 52. A first chain 56a can be coupled to the first sprocket 54a, and a second chain 56b can be coupled to the second sprocket 54b so that the second chain 56b substantially overlies the first chain 56a. As can be appreciated, conventional gears, motors, cams, and the like (not shown) can be utilized to urge movement of the rotatable shaft 52 as desired. In one aspect, the rotation speed can be an adjustable rotation speed. Optionally, the rotating assembly 50 can comprise two or more rotatable shafts 52 spaced apart a predetermined distance so that the chain 56 forms a continuous loop revolving about the two or more shafts 52.

In one aspect, the rotating assembly 50 can further comprise at least one rail 64 and at least one wheel 66 configured to support the chain 56. For example, each link 68 of the chain 56 can be coupled to a wheel 66 configured to engage and roll along the rail 64 so that the chain 56 is supported as it moves. In other aspects, the ratio of wheel 66 to chain link 68 can be greater than or less than one. So, for example, every other link 68 of the chain 56, every third link 68 of the chain 56, every fourth link 68 of the chain 56, and more than every fourth link 68 of the chain 56 can be coupled to a wheel 66. The rail 64 can extend along the length of the chain 56 so that the chain 56 is supported at all times.

The chain 56 comprises at least one mounting bracket 70 configured to couple a column 12 to the chain 56. In one aspect, the mounting bracket 70 defines at least one bore 72 or slot 74 so that a screw, bolt and the like can be used to detachably secure a column to the chain 56. If the chain comprises the second chain 56b substantially overlying the first chain 56a, a mounting bracket 70b of the second chain 56b can overlie a mounting bracket 70a of the first chain 56a so that each mounting bracket 70a, 70b engages the same column 12.

To assemble the paw tracker 10, a plurality of columns 12 can be coupled to the mounting brackets 70 of the chain 56 to form a matrix 76 of pockets 14. That is, the pockets 14 can be arranged horizontally in rows 78 as well as vertically in the columns 12. In one aspect, the pockets can be arranged in a matrix 76 of pockets 14 having n columns 12 and m rows 78, wherein n and m are integers between 1 and 1000. For example, the matrix 76 could have fifty columns 12 and nine rows 78 that form four hundred and fifty pockets 14. In another example, the matrix 76 could have one hundred columns 12 and fifteen rows 78 that form one thousand, five hundred pockets 14.

The paw tracker 10 further comprises at least one gate arm 80 configured to urge each gate 26 from the closed position to the open position at a predetermined time so that any contents of the pocket 14 can drop out of the bottom of the pocket 14. In one aspect, the gate arm 80 can be a rigid arm positioned at an obtuse angle relative to the direction of travel of the columns 12. In another aspect, the gate arm 80 can be spaced from the column 12 such that the gate arm 80 can engage a portion of the gate 26. For example, the gate arm 80 can be spaced from the column such that the gate arm 80 can engage the counterweight 30 of the gate 26. The gate arm 80 can be coupled to the paw tracker 10 with structural beams 82 so that each gate arm 80 can be maintained in the desired position and angle relative to a row 78 of pockets 14. The gate arm 80 can be formed from polymeric materials, such as nylon and the like.

In another aspect, there can be a gate arm 80 corresponding to each row 78 of the paw tracker 10. For example, if there are nine rows 78 in the matrix 76 of pockets 14, there can be nine separate gate arms 80, each gate arm 80 configured to engage the gates 26 of a single row 78. Optionally, in another aspect, a single gate arm 80 can be sized and shaped to engage the gates 26 of two or more rows 78. In still another aspect, the obtuse angle of gate arm 80 can be substantially the same. Alternatively, at least one gate arm 80 can be positioned at a different obtuse angle than an adjacent gate arm 80. As can be appreciated, changing the angle of the gate arm 80 relative to the direction of the travel of the column 12 can change the speed at which the gate 26 is actuated from the closed position to the open positioned.

Figure 4:
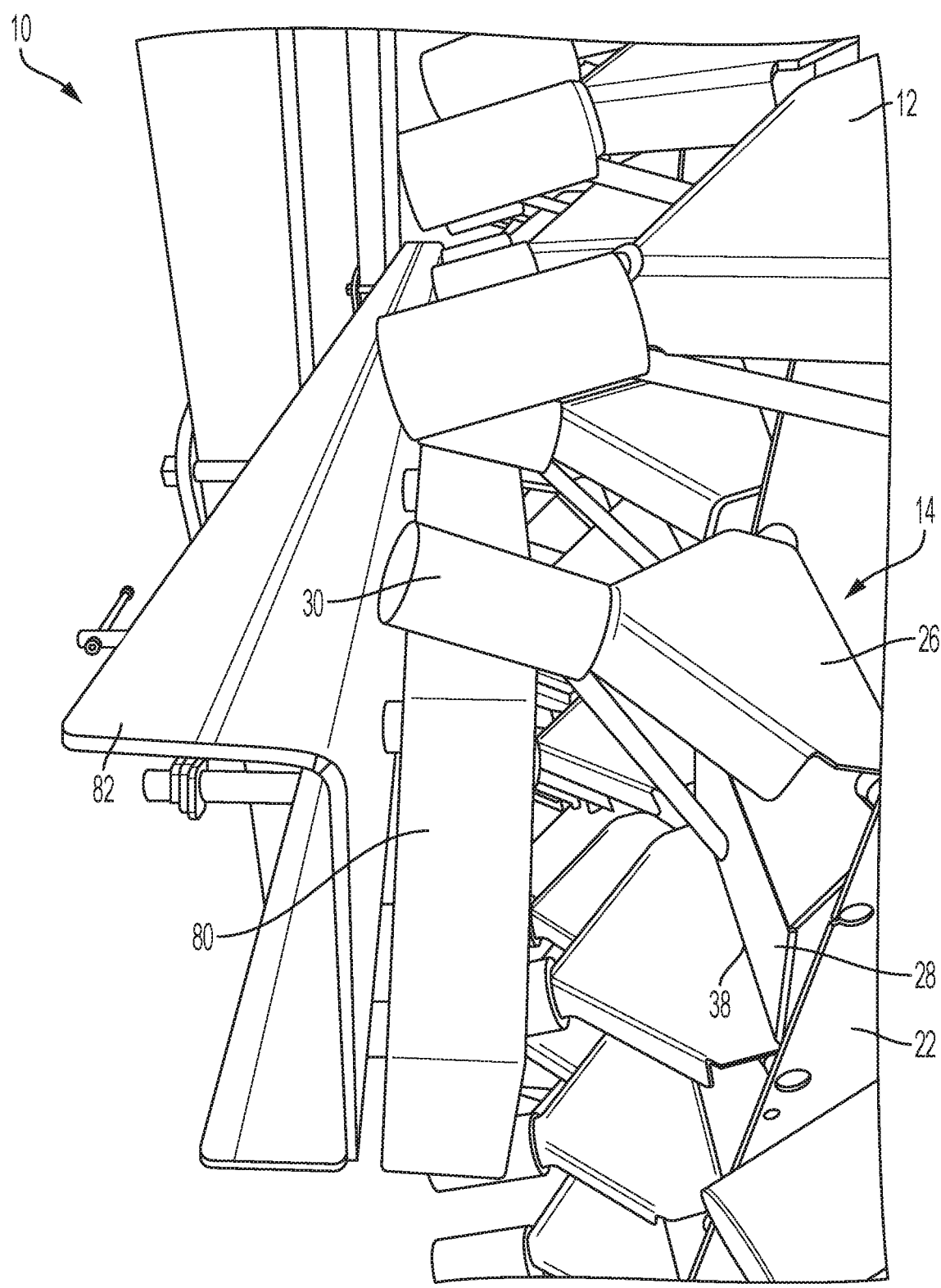
FIG. 4 is a side view of the paw tracker of FIG. 1, in which a gate arm is urging a gate of the paw tracker to an open position, according to one aspect.

In use, conventional gears, motors, cams, and the like can cause the shaft 52 to rotate, which in turn causes the sprocket 54 to rotate and the chain 56 to move at a desired chain speed and direction. Columns 12 can be coupled to the mounting brackets 70 of the chain 56 so that movement of the chain 56 causes the columns 12 to travel with the chain 56 around the shafts 52 of the rotating assembly 50. When a gate 26 on a column 12 approaches a gate arm 80, a portion of the gate arm 80, such as the counterweight 30, can come into contact with the gate arm 80 (as illustrated in FIG. 4). As the gate 26 continues to move relative to the gate arm 80, the obtuse angle of the gate arm 80 urges the counterweight 30 upwards relative to the surface on which the paw tracker 10 rests such that the gate 26 rotates about the pivot point 32. This rotation causes the base member 28 to move to the open position, in which the distal end 38 of the base member 28 is spaced from the rear wall 24 of the column 12 a predetermined distance so that any contents of the pocket 14 can drop out of the bottom of the pocket 14. As the gate 26 continues to move relative to the gate arm 80 the gate 26 can remain in the open position as long as the gate arm 80 is adjacent the gate 26. That is, once the gate 26 travels past the corresponding gate arm 80, the counterweight 30 can urge the gate 26 back to the closed position.

Figure 5:
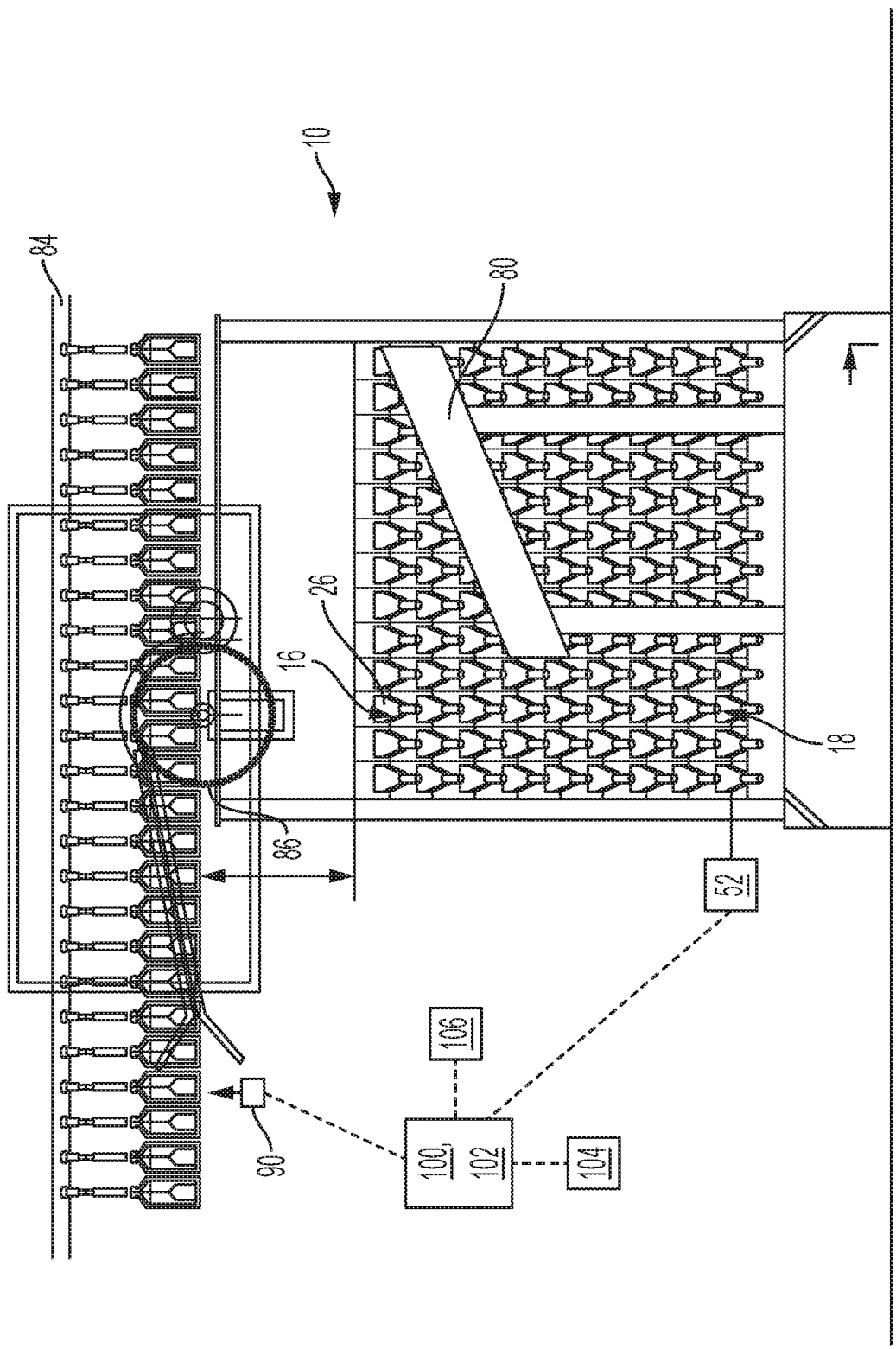
FIG. 5 is a perspective view of the paw tracker of FIG. 1 in use.
Figure 6:
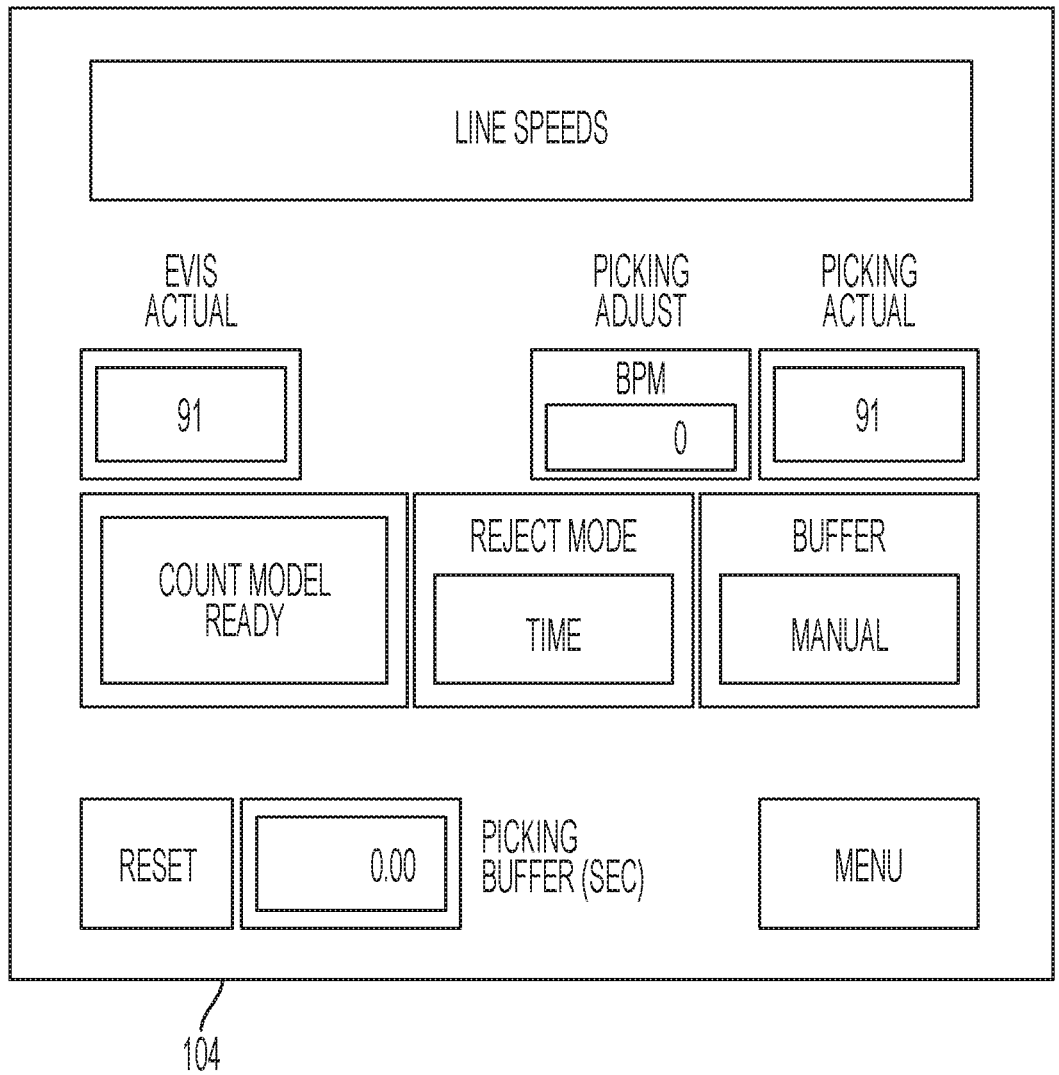
FIG. 6 is a view of a display device of the paw tracker of FIG. 1, according to one aspect.

Referring now to FIGS. 5 and 6, in one aspect, the paw tracker 10 further comprises at least one sensor 90 and a control system 100. In this aspect, the at least one sensor 90 can be electrically coupled to the control system 100. For example, the sensor 90 can be a proximity sensor 90 configured to sense the absence or presence of an object. In another example, the sensor 90 can be a photoelectric sensor 90 configured to sense the absence or presence of an object by using a light transmitter and a photoelectric receiver. In a further example, the sensor 90 can be an encoder coupled to the shaft 52 or to the motor and configured to sense the rotational speed of the shaft 52 or motor.

In one aspect, the control system 100 can comprise a processor 102 electrically coupled to the at least one sensor 90 and programmed to selectively monitor, display, set and/or control at least one of the operating parameters of the paw tracker 10. In another aspect, the processor 102 can be electrically coupled to at least one of the eviscerating line (not shown), the picking line 84, the motor and an actuator 108. Thus, in one aspect, the processor 102 can be configured to actuate the actuator 108 when appropriate so that rejected paws can be removed from the system. In another aspect, the processor 102 can be configured to monitor, display, set and/or control the speed at which the paw tracker 10 moves.

For example, the speed of the paw tracker 10 can be adjusted automatically by the processor 102 based on a speed of the picking line 84 and/or the eviscerating line. In another example, in one aspect, a counter or other sensor 90 sensing the speed and/or presence of paws on the picking line 84 and/or the eviscerating line can send this information to the processor 102. The at least one motor can be configured to selectively speed up or slow down the shaft 52 as necessary to provide for a desired rate of paws to be processed. That is, the processor 102 can control the speed at which the shaft 52 rotates, thereby controlling the speed at which the columns 12 move. Further, the at least one sensor 90 on the eviscerating line and on the picking line 84, and the sensor 90 of the paw tracker 10 can all provide counts to the processor 102. As these picking line 84 and/or the paw tracker counts reach the eviscerating count corresponding to the desired inspector location or locations, the processor 102 can update the remaining counts to the rejection point at the end of the paw tracker 10.

In one aspect, the paw tracker 10 can further comprise a timer 106. In this aspect, the timer 106 can be electrically coupled to at least one sensor 90 of the and/or the processor 102. The timer 106 can be configured to measure the amount of time passed upon receiving a signal from the at least one sensor 90 and/or the processor 102.

In one aspect, the processor 102 of the control system 100 can comprise, for example and without limitation, a computer or a Programmable Logic Controller (PLC), that is in communication with a display device 104. In another aspect, the processor 102 can be configured as part of a feedback control loop to selectively control the speed of the paws within a predetermined tolerance based on the speed sensed by the at least one sensor 90.

In one aspect, the control system 100 can further comprise the display device 104 configured to display at least one of: the speed at which the picking line is operating and the rejection mode in which the control system is operating. For example, the control system 100 can reject paws in "Time" mode. In Time mode, the time within which a paw has been in the paw tracker 10 can be monitored and paws can be rejected by correlating the time to a rejected carcass. In another example, in "Count" mode, the number of paws in the paw tracker 10 are counted and known. In Count mode, the processor 102 can correlate when the rejected paw reaches the rejection point (wherein the lowest pocket 14 of a column 12 is positioned above a rejection container) and the rejected carcass on the eviscerating line by counting the paws.

If there is an error with a sensor 90, the processor 102 can recognize the error and notify the operator of the sensor problem. In one aspect, the processor 102 can automatically switch from "Count" mode to "Time" mode so there is no loss of product. In another aspect, while in "Time" mode, a gate time can be varied to cover line stoppage. This can be a number proportional to the amount of time the line is stopped.

In use, at least a portion of the paw tracker 10 can be positioned adjacent to a paw cutter system 86 and/or a picking line 84 so that paws cut from a carcass can be positioned above a pocket 14 of the paw tracker 10. For example, at least a portion of the paw cutter system 86 and/or the picking line 84 can be positioned above the upper pocket 16 so that cut paws can drop from the paw cutter system 86 and/or the picking line 84 into the upper pocket 16. In use, the gate 26 of the upper pocket 16 can selectively open and drop the paws into a lower pocket 18 or into a desired receptacle for further processing.

More specifically, a paw removed from a carcass by, for example and without limitation, a paw cutter system 86 can be dropped into a pocket 14 of the paw tracker 10. For example, the paw can slide down a chute sized and shaped to align the paw with a pocket 14 of the uppermost row 78. The counterweight 30 urges the distal end 38 of the base member 28 into contact with the rear wall 24 of the column 12 to enclose the bottom of the pocket 14 so that the paw is contained within the pocket 14. The columns 12 can move at a speed so that each pocket 14 can have a desired number of paws in it. As the columns 12 move, each gate 26 will eventually come into contact with a gate arm 80, and this contact can urge the gate 26 from the closed position to the open position so that the paw or paws in the pocket 14 drop out of the bottom of the pocket 14 and fall into a pocket 14 defined in the row 78 directly below the uppermost row. This process continues until the paw reaches the lowest row 78.

Upon reaching the lowest row 78, the paw can be sorted into a desired receptacle. If the paw is rejected, (that is, if the carcass from which the paw came has been rejected), the processor 102 can send a signal to a user so that the rejected paw can be removed from the paw tracker 10. For example, if the carcass from which the paw came has been rejected, the control system 100 can use a count of paws and carcasses to correlate the rejected paw with the rejected carcass and to identify the location of the rejected paw. In another example, if the carcass from which the paw came has been rejected, the control system 100 can use a timer to correlate the rejected paw with the rejected carcass. If the paw is acceptable, the columns 12 can move until a gate arm 80 urge the gate 26 from the closed position to the open position so that the paw or paws in the pocket 14 drop out of the bottom of the pocket 14 and fall into a pocket 14 into a first receptacle.

As can be appreciated, the paw tracker 10 has a small footprint. In one aspect, the capacity of the paw tracker 10 can be increased by simply an additional row 78 on top of existing rows. In another aspect, while running in "Count" mode, line stretch in any of the picking and/or eviscerating lines can be irrelevant because the number of paws and carcasses is monitored and tracked. The paw tracker 10 can easily be combined with a paw cutter system 86 to put an exact number of paws in a pocket 14 in exact time. Hence, there can be outstanding correlation between a rejected carcass and the paw corresponding thereto. In a further aspect, the plurality of sensors 90 coupled to the processor 102 can eliminate any issues with line speed variations or line stoppage of the eviscerating line. Further, each sensor 90 can be independent hence every line stoppage or speed variation can be sensed.

In one aspect, the design of the paw tracker 10 allows for quick and easy removal of the columns 12 for clean up, sanitation and maintenance. For example, a column 12 can easily be removed from the paw tracker 10 by removing a few fasteners.

Although several aspects of the invention have been disclosed in the foregoing specification, it is understood by those skilled in the art that many modifications and other aspects of the invention will come to mind to which the invention pertains, having the benefit of the teaching presented in the foregoing description and associated drawings. It is thus understood that the invention is not limited to the specific aspects disclosed hereinabove, and that many modifications and other aspects are intended to be included within the scope of the appended claims. Moreover, although specific terms are employed herein, as well as in the claims that follow, they are used only in a generic and descriptive sense, and not for the purposes of limiting the described invention.

What is claimed is:

1. A paw tracker system for maintaining poultry paws in an ordered manner comprising:
   a plurality of substantially vertical columns, each column at least partially defining a plurality of pockets substantially vertically aligned on the column;
   a plurality of gates, each gate corresponding to a pocket of the plurality of pockets, wherein each gate is rotatable about and between a closed position, in which a portion of the gate contacts a rear wall of the column and encloses a bottom of the pocket, and an open position, in which the portion of the gate is spaced from the rear wall a predetermined distance;
   at least one gate arm configured to urge each gate of the plurality of gates from the closed position to the open position at a predetermined time; and
   a rotating assembly configured to move the plurality of columns at a predetermined speed,
   wherein the poultry paw is positionable in a pocket of the plurality of pockets, wherein movement of the rotating assembly causes the gate of the pocket to contact the at least one gate arm and urge the gate to the open position, and wherein in the open position, the poultry paw drops out of the pocket.

2. The paw tracker system of claim 1, wherein the plurality of pockets comprises a lower pocket and an upper pocket substantially overlying the lower pocket, wherein the poultry paw is positionable in the upper pocket with the gate of the upper pocket in the closed position, and wherein in the open position, the poultry paw drops from the upper pocket into the lower pocket.

3. The paw tracker system of claim 1, wherein each column of the plurality of columns comprises a left sidewall, an opposed right sidewall and the rear wall extending between the left sidewall and the right sidewall.

4. The paw tracker system of claim 3, wherein a gate of the plurality of gates extends between the left sidewall and the right sidewall such that the gate is opposed to the rear wall, and wherein the gate is rotatably coupled to the left sidewall and the right sidewall.

5. The paw tracker system of claim 4, wherein the gate comprises a base member and a counterweight, and wherein the left sidewall, the right sidewall, the rear wall and the base member of the gate cooperate to define a pocket.

6. The paw tracker system of claim 5, wherein the counterweight of the gate extends away from the base member a predetermined distance, and wherein the counterweight is configured to maintain the gate in the closed position.

7. The paw tracker system of claim 6, wherein the plurality of columns are positioned to form a matrix of pockets arranged horizontally in rows and vertically in the columns.

8. The paw tracker system of claim 7, wherein the at least one gate arm is a rigid arm positioned at an obtuse angle relative to the direction of travel of the plurality of columns, and wherein the gate arm is spaced from the column so the gate arm is engageable with the counterweight of the gate.

9. The paw tracker system of claim 8, wherein the at least one gate arm comprises a gate arm corresponding to each row.

10. The paw tracker system of claim 8, wherein the at least one gate arm comprises a single gate arm that is engageable with the gates of at least two rows.

11. The paw tracker system of claim 1, wherein the rotating assembly comprises at least one substantially vertical rotatable shaft, at least one sprocket coupled to the shaft, and at least one chain coupled to the sprocket, and wherein the plurality of columns are attachable to the chain.

12. The paw tracker system of claim 1, further comprising a processor and at least one sensor electrically coupled to the processor.

13. The paw tracker system of claim 12, wherein at least one sensor senses the presence of a poultry paw, and wherein at least one sensor senses the speed of movement of the plurality of columns.

14. The paw tracker system of claim 13, wherein the processor is configured to count the number of poultry paws sensed by the at least one sensor, and wherein the processor correlates when a poultry paw reaches a predetermined pocket by comparing the number of poultry paws, number of pockets and speed of the columns.

15. The paw tracker system of claim 12, wherein the processor monitors the time within which a poultry paw has been positioned in the paw tracker system.

16. The paw tracker system of claim 1, wherein the poultry paw is automatically supplied to the paw tracker system by a paw cutter system.

17. A method of maintaining poultry paws in an ordered manner comprising:
   providing a paw tracker system comprising:
      a plurality of substantially vertical columns, each column at least partially defining a plurality of pockets substantially vertically aligned on the column;
      a plurality of gates, each gate corresponding to a pocket of the plurality of pockets, wherein each gate is rotatable about and between a closed position, in which a portion of the gate contacts a rear wall of the column and encloses a bottom of the pocket, and an open position, in which the portion of the gate is spaced from the rear wall a predetermined distance;
      at least one gate arm configured to urge each gate of the plurality of gates from the closed position to the open position at a predetermined time; and
      a rotating assembly configured to move the plurality of columns at a predetermined speed; and
   positioning a poultry paw in a first pocket of the plurality of pockets, wherein movement of the plurality of columns causes the gate of the first pocket to engage the gate arm and rotate from the closed position to the open position such that the poultry paw drops from the first pocket.

18. The method of claim 17, wherein the paw tracker system further comprises a processor and at least one sensor electrically coupled to the processor.

19. The method of claim 18, wherein the processor is configured to count the number of poultry paws sensed by the at least one sensor, and wherein the processor correlates when a poultry paw reaches a predetermined pocket by comparing the number of poultry paws, number of pockets and speed of the columns.

20. A paw tracker system for correlating a poultry paw with the carcass from which it was removed, the paw tracker comprising:

a plurality of columns, each column at least partially defining a plurality of pockets vertically aligned on the column;

a plurality of rotatable gates, each gate corresponding to a pocket of the plurality of pockets, at least one gate arm configured to urge each gate of the plurality of gates from a closed position to an open position at a predetermined time; and a rotating assembly configured to move the plurality of columns at a predetermined speed, wherein the poultry paw is positionable in a pocket of the plurality of pockets, wherein movement created by the rotating assembly causes the gate of the pocket to contact the at least one gate arm and urge the gate to the open position, and wherein in the open position, the poultry paw drops out of the pocket.

\* \* \* \* \*